United States Patent [19]
Yasui et al.

[11] Patent Number: 4,568,123
[45] Date of Patent: Feb. 4, 1986

[54] HEAD-REST VERTICAL ADJUSTMENT DEVICE

[75] Inventors: Takashi Yasui; Hideo Niibori, both of Akishima, Japan

[73] Assignee: Tachikawa Spring Co., Ltd., Japan

[21] Appl. No.: 636,286

[22] Filed: Jul. 31, 1984

[30] Foreign Application Priority Data

Aug. 2, 1983 [JP] Japan .......................... 58-120364[U]

[51] Int. Cl.⁴ ........................ A47C 7/36; A47C 1/10
[52] U.S. Cl. .................................. 297/410; 248/118.3; 248/408; 292/85; 403/325
[58] Field of Search .............. 297/410, 391, 396, 353; 248/118.3, 118.5, 118, 407, 408, 409; 403/330, 326, 322, 325; 292/85, 83

[56] References Cited

U.S. PATENT DOCUMENTS

| | | | |
|---|---|---|---|
| 464,413 | 12/1891 | Armstrong | 292/83 |
| 2,939,514 | 6/1960 | Buettner et al. | 248/408 |
| 2,967,006 | 1/1961 | Sykes | 248/407 X |
| 3,191,900 | 6/1965 | Cayot | 248/407 X |
| 3,512,833 | 5/1970 | Sugiura | 297/410 |
| 3,544,162 | 12/1970 | Uchiyamada et al. | 297/410 |
| 3,563,602 | 2/1971 | Ohta | 297/410 |
| 3,750,227 | 8/1973 | Hayhurst et al. | 403/325 X |
| 3,944,153 | 3/1976 | Linker | 403/330 X |
| 3,979,150 | 9/1976 | Elzenbeck | 297/410 |

FOREIGN PATENT DOCUMENTS

| | | | |
|---|---|---|---|
| 2808381 | 6/1979 | Fed. Rep. of Germany | 297/410 |
| 80930 | 5/1982 | Japan | 297/391 |
| 144135 | 9/1982 | Japan | 297/410 |
| A2064312 | 6/1981 | United Kingdom | 297/410 |

Primary Examiner—William E. Lyddane
Assistant Examiner—Thomas A. Rendos
Attorney, Agent, or Firm—Cushman, Darby & Cushman

[57] ABSTRACT

A head-rest vertical adjustment device is disclosed which is provided with a lock mechanism to restrict the vertical movements of a head-rest stay in a guide cylinder into which the head-rest stay is inserted in a manner that it is free to move vertically. This lock mechanism comprises a lock spring of a wire material to be engaged into an engagement groove formed in the head-rest stay from a slit formed in the guide cylinder, and an operation lever to release the lock spring from its locked position. First ends of both the lock spring and operation lever are rotatably mounted onto the same projection provided in the guide cylinder and second ends of these two members are integrally connected to each other.

3 Claims, 5 Drawing Figures

HEAD-REST VERTICAL ADJUSTMENT DEVICE

BACKGROUND OF THE INVENTION

1. Field of the Invention

The present invention relates to a head-rest vertical adjustment device for adjusting the height of a head-rest for a vehicle seat, and, more particularly, to an improved lock mechanism wherein a stopper for locking is integrally formed with a spring material member to bias the stopper in a direction toward engagement grooves formed in head-rest stays.

2. Description of the Prior Art

Conventionally, as one of integral combinations of a stopper and a spring member, there is known a lock mechanism using a lock spring which is formed of such a wire material as disclosed in Japanese Utility Model Publication No. 73448 of 1981. Such conventional lock mechanism is simple in construction since the lock spring is provided at its front end with an integral operation portion such as an operation knob to release a locked condition established by such lock spring. Such conventional lock mechanism, however, presents a disadvantage. Namely, during long periods of use, since forces applied to the operation knob are directly given to the lock spring, the lock spring is caused to deform and thus it will not be able to provide a complete locking.

SUMMARY OF THE INVENTION

Accordingly, it is an object of the invention to provide a head-rest vertical adjustment device equipped with a lock mechanism which prevents damage of a lock spring even during long periods of use.

It is another object of the invention to provide a head-rest vertical adjustment device equipped with a lock mechanism which permits a smooth release of locking.

In accomplishing these objects, according to the invention, a guide cylinder, into which head-rest stays are inserted such that they are free to move vertically, is provided with a lock mechanism for limiting the vertical movements of the stays. The lock mechanism comprises a wire lock spring disposed within a slit formed in the guide cylinder and engageable into engagement grooves formed in the stays from the slit, and an operation lever for releasing the engaged state of the lock spring. The lock spring and operation lever are rotatably mounted to the same projection provided on the guide cylinder, and other ends of these two members are connected with each other integrally.

These and other objects and advantages of the invention may be readily ascertained by referring to the following detailed description and appended drawings.

DETAILED DESCRIPTION OF A PREFERRED EMBODIMENT OF THE INVENTION

An embodiment of the invention will be described in detail with reference to the accompanying drawings.

Figure 5:
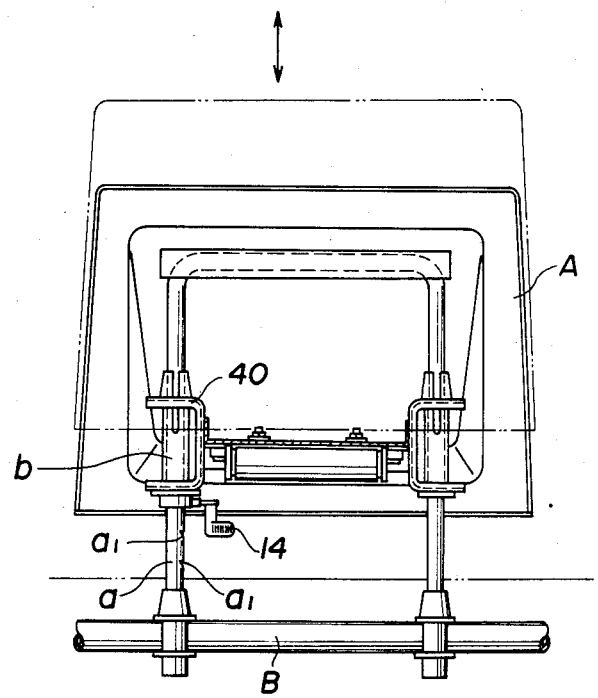

In the drawings, reference character (a) designates a stay to which a head-rest (A) is mounted such that the head-rest (A) is free to move in a vertical direction. (b) represents a guide cylinder fixed to the head-rest (A) and mounted slidably in a vertical direction relative to the stay (a). The stay (a) is formed at one of its side walls with a plurality of multistep-wise locking or engagement grooves ($a_1$)—which are spaced from one another at given intervals, (FIG. 5). Although the illustrated stay (a) is fixed at its lower end to a seat frame (B) of a seat back and enables the head-rest (A) to be free to move vertically, of course, a conventional stay that is so mounted as to be free to move relative to the seat frame (B) may also be employed. Since the above-mentioned guide cylinder (b) is provided in the head-rest (A), a lock mechanism to be described later is disposed in the bottom portion of the head-rest (A).

Figure 1:
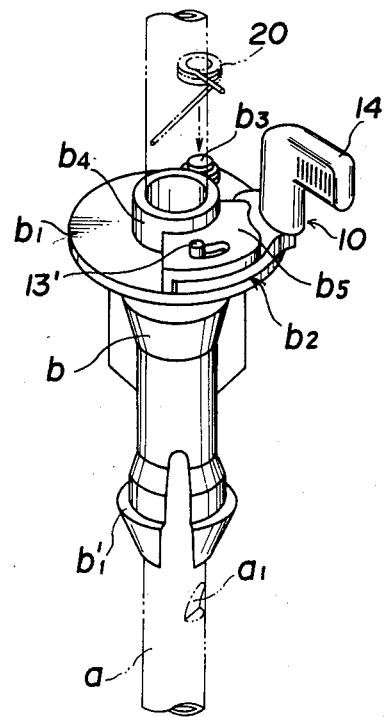
FIG. 1 is a perspective view of an embodiment of a lock mechanism provided in a head-rest vertical adjustment device constructed in accordance with the invention.
Figure 2:
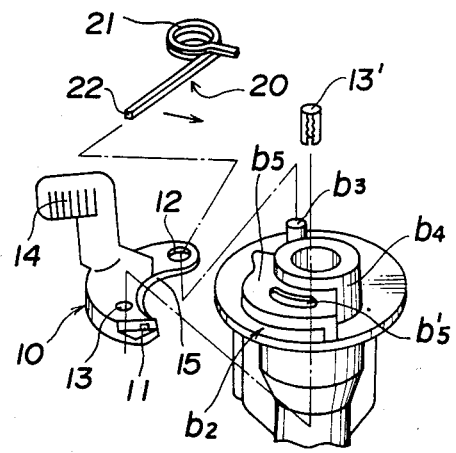
FIG. 2 is an exploded view of the lock mechanism shown in FIG. 1, cut away in part.

The guide cylinder (b) has two flange portions ($b_1$) ($b_1'$) respectively in its upper and lower portions and is secured to a bracket (40) of the head-rest (A). The upper flange ($b_1$) (shown in the upper portions in FIGS. 1 and 2) is provided with the lock mechanism.

The lock mechanism consists of a lock spring (20) formed of a wire material and an operation lever (10). Both of the two members (20) (10) are mounted within a slit ($b_2$) formed in the flange ($b_1$) of the guide cylinder (b), with their respective first ends being secured to a projection ($b_3$) provided in the flange portion ($b_1$).

The flange ($b_1$) of the guide cylinder (b) is integrally provided with a cylindrical body ($b_4$), and the cylindrical body ($b_4$) is equipped on its side surface with a plate ($b_5$) with a predetermined distance from the upper surface of the flange ($b_1$). The clearance between the plate ($b_5$) and the flange ($b_1$) upper surface is used to provide the slit ($b_2$), which slit ($b_2$) is also arranged to face a through-bore for insertion of the stay. The lock spring (20) mounted within this slit ($b_2$) is adapted to be engageable with the locking grooves ($a_1$) in the stay (a). At a predetermined position in the plate ($b_5$) spaced apart from the projection ($b_3$) is formed an elongated bore ($b_5'$), into which is inserted a pin (13') to be mounted to the operation lever (10).

Operation lever (10) comprises an arc-shaped sliding section (15), a through bore (12) formed at one end of the sliding section (15) for insertion of the projection ($b_3$), a fitting hole (13) formed on the opposite side of the through-bore in the sliding section (15) for insertion of the above-mentioned pin (13'), a through-port (11) for insertion of one end of the lock spring (20), and a knob section (14) projected upright on and from the outside of the sliding section (15) integrally therewith. Operation lever (10) is rotated about the projection ($b_3$) within the slit ($b_2$) but its rotational movements are restricted within a predetermined range by the pin (13'), so that the operation lever (10) is prevented from abutting against the stay (a) which is fitted within the guide cylinder (b).

Lock spring (20) is formed of a wire material (spring material). It has a winding section (21) mounted to the projection ($b_3$) and a leading end inserted into the throughport (11) of the operation lever (10) and always biased in a direction toward the engagement groove ($a_1$) of the stay (a) due to the elasticity thereof. Therefore, the elasticity of the lock spring (20) permits the operation lever (10) to be accomodated properly without being rickety.

Figure 3:
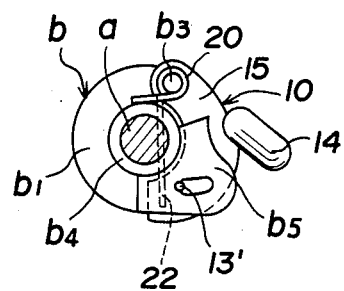
FIG. 3 is a sectional view of the lock mechanism shown in FIG. 1, illustrating a state wherein it is locked.
Figure 4:
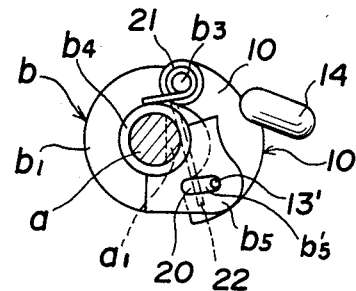
FIG. 4 is a sectional view of the lock mechanism shown in FIG. 1, illustrating a state wherein it is released from its locked position; and, FIG. 5 is a front view of an embodiment of the head-rest vertical adjustment of the invention.

Thus, the lock spring (20) is, due to its elasticity, engaged into the engagement groove ($a_1$) of the stay (a) to restrict the vertical movements of the head-rest (A), (FIG. 3). If the operation section (14) of the operation lever (10) is pushed to move against the elasticity of the lock spring (20), then the lock spring (20) is disengaged out of the engagement groove ($a_1$) of the stay (a) to allow the head-rest (A) to be free to move verticaly, (FIG. 4). After the head-rest (A) is adjusted to a desired height, as described before, the lock spring (20), due to its elasticity, is again engaged within the engagement groove ($a_1$) of the stay (a) to establish a locked condition.

As described hereinbefore, according to the invention, since one end of the lock spring is mounted to the guide cylinder as with the operation lever and the other end thereof is connected to the other end of the operatin lever, when the operation lever is operated to release locking, the lock spring can be rotated smoothly against the elasticity thereof as well as the lock spring is prevented against damage even if it is used for a long time. In addition, because the operation lever has the same center of rotation with the lock spring, a locked condition can be released smoothly.

What is claimed is:

1. A head-rest vertical adjustemt device including a lock mechanism for restricting the vertical movements of a head-rest stay within a guide cylinder into which said head-rest stay is fitted in such a manner that said guide cylinder is free to move vertically, characterized in that said lock mechanism comprises a lock spring formed of a wire material to be engaged into an engagement groove of said stay from a slit of said guide cylinder and an operation lever for releasing said lock spring from its locked position, and also that both of said lock spring and operation lever are movably mounted onto the same projection provided in said guide cylinder and the other ends of said operation lever and lock spring are integrally connected to each other.

2. The head-rest vertical adjustment device as claimed in claim 1, characterized in that said slit of said guide cylinder is defined by a flange provided in said guide cylinder and a plate provided on said flange with a predetermined distance from the upper surface of said flange, said flange is provided with said projection onto which said lock spring and operation lever are rotatably mounted, and said operation lever comprises an arc-like sliding section to be slid within said slit and a knob section located outwardly of said slit and provided integrally with said sliding section.

3. The head-rest vertical adjustment device as claimed in claim 2, characterized in that said plate is formed with an elongated bore, and a pin mounted to said sliding section of said operation lever is inserted through said elongated bore.

* * * * *